No. 664,868. Patented Jan. 1, 1901.
L. JOHNSON.
ELECTRICALLY OPERATED CUT-OFF VALVE FOR ENGINES.
(Application filed Nov. 18, 1899.)
(No Model.) 3 Sheets—Sheet 1.
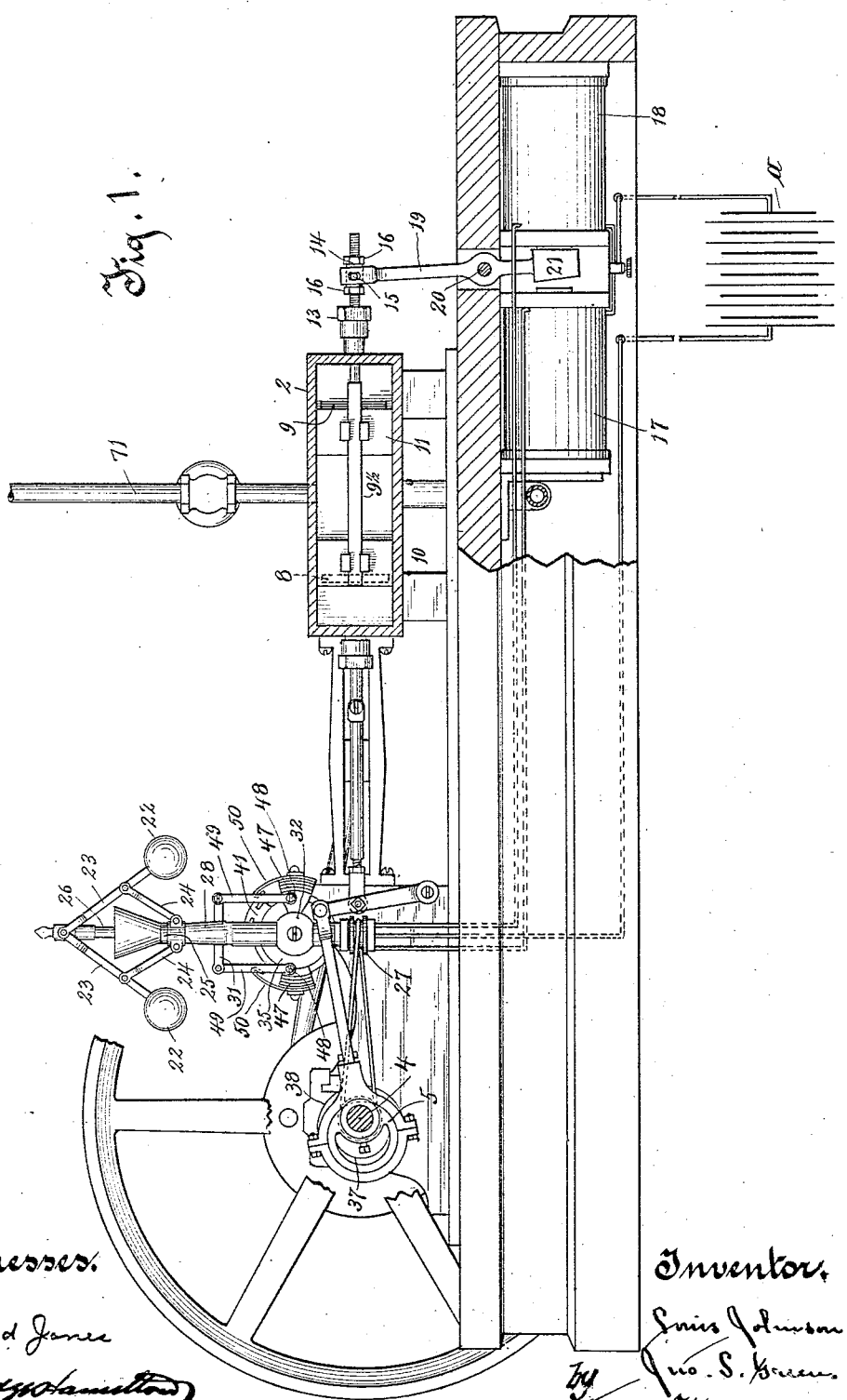
Witnesses.
Lloyd Jones
Tallmadge Hamilton
Inventor,
Lewis Johnson
Jno. S. Green
by
Attorney.

No. 664,868. Patented Jan. 1, 1901.
L. JOHNSON.
ELECTRICALLY OPERATED CUT-OFF VALVE FOR ENGINES.
(Application filed Nov. 18, 1899.)
(No Model.) 3 Sheets—Sheet 2.
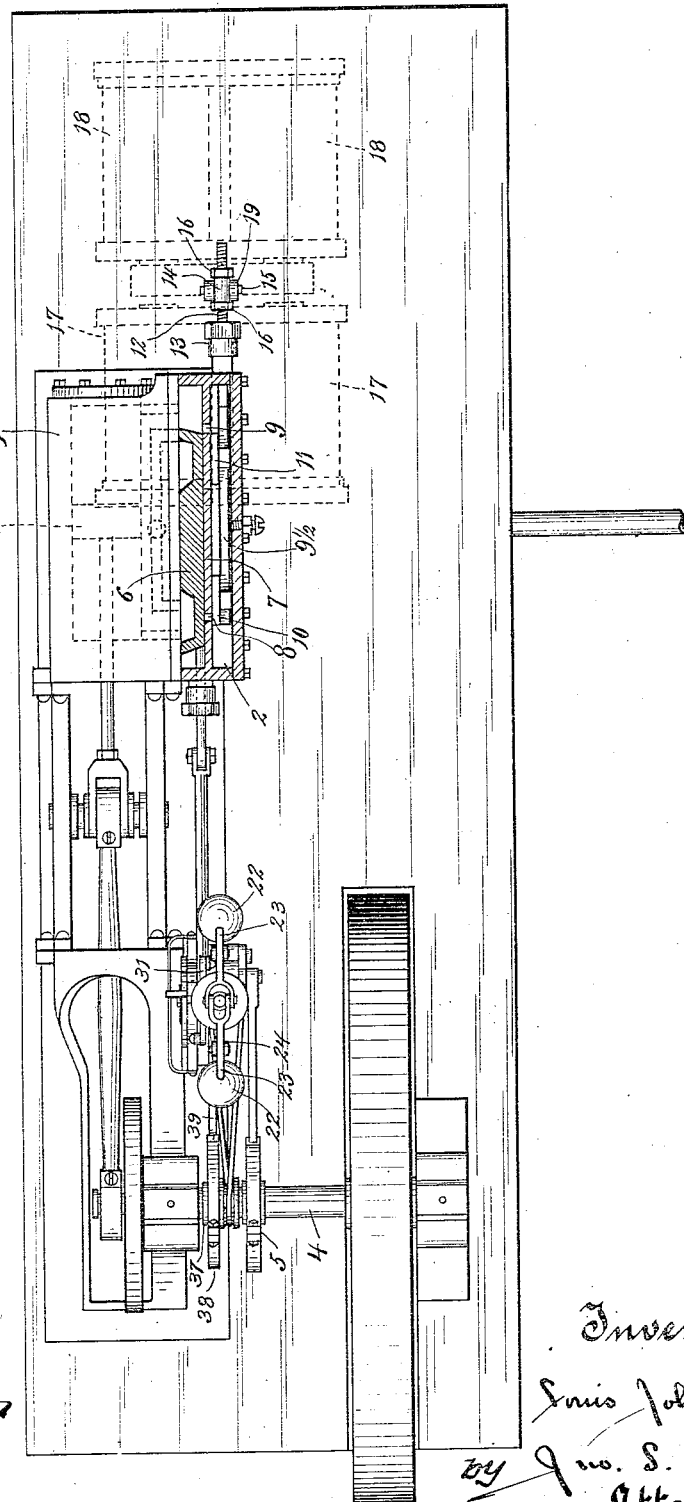

No. 664,868. Patented Jan. 1, 1901.
L. JOHNSON.
ELECTRICALLY OPERATED CUT-OFF VALVE FOR ENGINES.
(Application filed Nov. 18, 1899.)
(No Model.) 3 Sheets—Sheet 3.
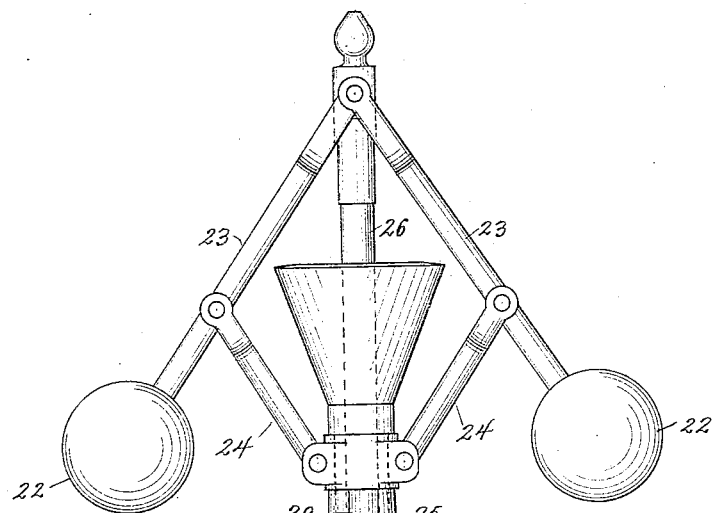
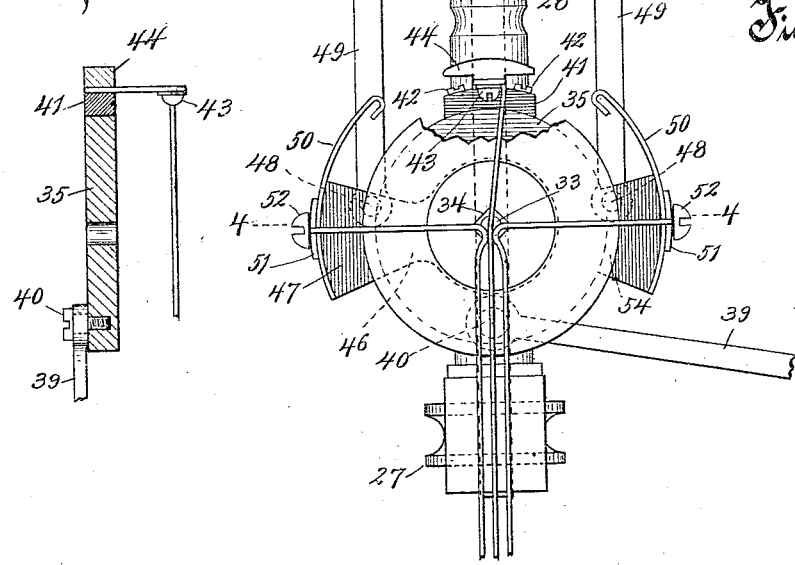
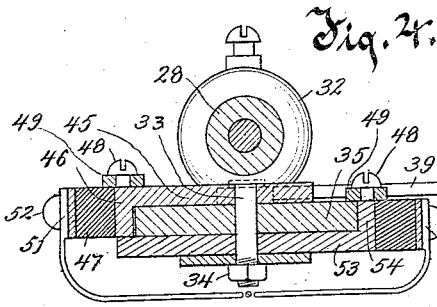

UNITED STATES PATENT OFFICE.

LOUIS JOHNSON, OF MILWAUKEE, WISCONSIN, ASSIGNOR OF ONE-HALF TO ALBERT C. E. ICKE, OF SAME PLACE.

ELECTRICALLY-OPERATED CUT-OFF VALVE FOR ENGINES.

SPECIFICATION forming part of Letters Patent No. 664,868, dated January 1, 1901.

Application filed November 18, 1899. Serial No. 737,418. (No model.)

*To all whom it may concern:*

Be it known that I, LOUIS JOHNSON, a citizen of the United States of America, residing at Milwaukee, in the county of Milwaukee and State of Wisconsin, have invented certain new and useful Improvements in Electrically-Operated Cut-Off Valves for Engines, of which the following is a specification.

My invention relates to automatic cut-offs for steam-engines in which the steam-valves and the exhaust are operated by an eccentric, and particularly to cut-offs for the same operated electrically.

One object of my invention is to produce a mechanism operated electrically to work quickly, variably, automatically, and economically in cutting off and regulating the supply of steam to the cylinder of an engine in which the steam-valves and the exhaust are operated by an eccentric or other positive means connected with moving parts of the engine and also to regulate the speed of the engine.

A further object of my invention is to produce an automatic electrically-operated mechanism to quickly and entirely cut off the supply of steam when the engine races.

A still further object of my invention is to produce in an electrically-operated cut-off device to be used in connection with engines in which the steam-valves are operated by an eccentric or its equivalent an automatic and variable mechanism for operating, closing, and transferring the circuit alternately as the stroke of the engine alternates.

These objects I attain by the mechanism and the arrangements of the several parts shown in the drawings and hereinafter described.

In this application for the sake of simplicity I have shown my device applied to an ordinary cut-off engine; but I do not limit my invention to its application to any particular style or type of engine as long as the steam-valves and the exhaust are operated by positive means connected to the main shaft of the engine or some other moving part.

In the drawings, Figure 1 is a side view in elevation of an engine to which my invention is applied. This view shows the steam-chest in cross-section and a portion of the bed broken away to expose a portion of mechanism for operating the cut-off. Fig. 2 is a top plan view of the same engine with the steam-chest in cross-section. Fig. 3 is a side elevation of the governor and shows a portion of my device connected to the same. Fig. 4 is a view in cross-section taken on line 4 4 in Fig. 3. Fig. 5 is a detail view in cross-section of a portion of my device shown in Fig. 3.

Similar parts throughout the several views are denoted by like characters.

In the drawings the engine shown of the ordinary horizontal adjustable slide-valve type is provided with a cylinder 1, steam-chest 2, and piston 3, with the usual connections to the main shaft 4 of the engine. The shaft 4 is provided with an eccentric 5, having its strap, lever, and connecting-rod to the slide-valve 6 in the steam-chest. In the steam-chest and forming a seat for the cut-off valve and forming one side of the working chamber for the steam-valve a plate 7 is located, having the two steam-ports 8 and 9. In the chamber formed by this plate and the side of the steam-chest a cut-off member or valve 9½ is situated. This cut-off member may be of any desired form so long as it accomplishes its purpose; but in the drawings it is shown as formed of two plates 10 and 11, connected together in the usual manner and having a rod extending out through the rear of the steam-chest passing through a suitable stuffing-box 13.

A portion of the cut-off rod 12, outside of the stuffing-box 13, may be screw-threaded, and around this screw-threaded portion a sleeve 14 will be loosely fitted. This sleeve, which may be held at any portion of this cut-off rod by means of the adjustment-nuts 16 on either side, is provided with projecting lugs 15.

Beneath the bed of the engine and in a suitable position under the steam-chest electromagnets 17 17 and 18 18 are placed in pairs oppositely. A lever 19, fulcrumed at 20 to any desired portion of the bed, is formed at its lower end into an armature 21, which will swing between the two pairs of magnets. The upper arm of the lever 19 is bifurcated and slotted to engage the projecting lugs 15 of the sleeve 14, surrounding the cut-off rod.

The governor shown in the drawings is of the ordinary type and has balls 22, ball-arms 23, and links 24, connected to a vertically-sliding sleeve 25. The ball-arms 23 are secured to the governor-stem 26, which will be rotated within the sleeve 25 by means of a pulley 27, secured to its lower end. Surrounding the vertically-movable sleeve 25 is a stationary sleeve or governor-stand 28, provided with a slot 29. The sleeve 25 is provided with the lug 30, which projects through slot 29 of the outer sleeve and carries a cross-arm 31.

A short distance above pulley 27 the stationary sleeve 28 is surrounded by a collar 32, Fig. 4, movable on said sleeve and provided at its front with a short cylindrical arm 33, screw-threaded at its outer end to receive a nut 34. Collar 32 is held against movement on this sleeve by means of set-screw 32½. Mounted on the arm 33 is a circular oscillating disk 35.

On shaft 4, adjacent to eccentric 5, is an eccentric 37, provided with a strap 38. A rod 39 is secured in any suitable manner at one end to strap 38, while the other end of the rod is flattened and formed with an eye which surrounds the pin 40, carried by disk 35, near its bottom. At its top, or directly opposite to pin 40, is an insulating member 41, which may be made of any suitable material and may be secured to disk 35 by means of screws 42 or in any desired manner. A commutator or oscillating member or element, piece of metal, or other suitable material 44 (preferably non-arcing metal) is secured to the insulating member 41 and is curved on its top and provided with a binding-post 43.

Between the circular disk 35 and the collar 32 and mounted on the arm 33 is a disk 45, formed with an arm 46, extending beyond the periphery of disk 35. Secured to the edge of arm 46 is an insulating member 47, curved on its outer periphery. The arm 46 is also provided with a projecting pin 48. A link 49, one end of which surrounds the projecting pin 48, connects the arm 46 to one end of cross-arm 31. A contact member or element, having a movement the length of which depends upon the speed of the engine, formed of a strip of metal or other suitable material 50, (preferably non-arcing metal,) bent in the arc of a circle, with its upper end bent under to form a hook, lies along the outer periphery of and is secured to the insulating member 47 by means of a washer 51 and a binding-post 52. The arm 46 of disk 45 at its outer end is made broad enough to come in line with the front face of disk 35, as shown in Fig. 4, so that the metallic contact member or element 50 will lie in the same plane as the commutator or oscillating metallic contact member 44.

Mounted on arm 33 and in front of disk 35 is a disk 53, larger in diameter than disk 35 and at one side formed with a shoulder 54, projecting backwardly to the rear face of disk 35. Disk 53 adjacent to this offset portion or shoulder is provided with an insulating member and a metallic contact member or element similar to those carried by disk 45. This disk is also provided with a pin 48 and connected by a link 49 with the other end of arm 31.

A wire is secured to the metallic commutator or oscillating contact member 44 by means of the binding-post 43 and connects with one pole of an electric supply $a$. A wire connects with the metallic contact member or element 50 and passes through one pair of the electromagnets 18. A similar wire connects with the metallic contact member or element carried by disk 53 and connects with the pair of electromagnets 17. These electromagnets are shown coupled together and connected to the other pole of the electric supply.

Operation: After steam has been admitted to the cylinder and the engine is in operation the disk 35 by means of eccentric 37 and the rod connecting the strap of said eccentric and the disk will oscillate from side to side. The eccentric is so placed that the commutator or oscillating metallic contact member or element 44, carried by the disk, will move toward the cylinder as the piston moves out toward the shaft of the engine. This disk 35 will oscillate in the opposite direction as the piston moves in. In the drawings the stroke or the distance through which the disk 35 will oscillate is shorter than the stroke of the piston, or, in other words, before the piston has moved to the end of its outer stroke the disk 35 will start to oscillate in the opposite direction or in the same direction as the piston is moving. This, however, can be varied as desired to give the engine different speeds. As the engine increases in speed the governor-balls will rise and by means of the connecting members and the cross-arm 31 will cause disks 45 and 53 to oscillate, so that each disk will carry its movable or pivoted metallic contact element or member 50 up toward the commutator or metallic oscillating contact member 44. If the engine is running fast enough, these disks will oscillate or be raised high enough so that the metallic contact members or elements 50 will contact with the commutator or oscillating metallic contact member 44 as the disk carrying the same oscillates. Suppose that the engine is set to cut off at the three-quarter stroke and that it is carrying a full load. If the load is diminished or taken off altogether, then the two oscillating members 45 and 53 will be carried into operative position immediately, and the engine will cut off on each stroke as soon as enough steam has been admitted to carry the load then on, and the engine will be held at its normal speed. If the piston is on its outward stroke and the governor-balls are raised high enough, the movable metallic contact member or element 50 of the disk 45 will contact with the commutator or oscillating metallic contact member 44 and close the circuit and cause the magnets 18, through the medium of the armature 21 and the lever 19, to shift the cut-off member, and thereby cut off the supply of steam throughout the remainder of the stroke. As the piston moves on its inward stroke and the governor-balls are high enough the movable metallic contact member or element 50 of the disk 53 will contact with the commutator or oscillating metallic contact member 44, and by means of the electromagnets 17 and the intermediate mechanism the cut-off member will be shifted. In this manner it will be seen that I have produced an electrically-operated cut-off mechanism which will regulate the supply of steam passing into the cylinder before it reaches the steam-valve.

Be it understood that in this application I do not limit my invention to the construction of the elements shown or to the materials specified in their make-up, as the same may be changed and varied to meet different requirements.

Having thus described my invention, what I claim is—

1. In an engine, a mechanically-operated inlet-valve, a cut-off valve, a source of electric supply, electromagnets which when excited are adapted to close said cut-off valve, and means for controlling the action of said electromagnets.

2. In engines, mechanically-operated inlet-valves, a cut-off member connected to an armature, electromagnets through the attraction of which said cut-off member is operated, and means for automatically exciting the magnets.

3. In an engine, inlet-valves, electromagnets, and cut-off valves adapted to be opened and closed through the attractive power of said magnets.

4. In an automatic cut-off for engines in which the inlet-valves are mechanically operated, cut-off valves and means electrically operated for opening and closing said cut-off valves.

5. In an electric cut-off for steam-engines in which the steam-valves are operated by an eccentric, a cut-off member, an armature in connection with said cut-off member, electromagnets, an oscillating commutator connected to one pole of an electric supply, a governor, and two oscillating contact members connected to a similar pole in said electric supply.

6. In an engine, mechanically-operated inlet-valves, cut-off valves, an electric circuit, electromagnets in said circuit and means adapted when the speed of the engine is above normal to open and close said cut-off valves through the attractive force of said electromagnets.

7. The combination with an engine having mechanically-operated inlet and exhaust valves, of an independent cut-off valve and electrically-actuated means for opening and closing said cut-off valve.

8. In an engine, the combination of the main and exhaust valves mechanically operated with a variable cut-off mechanism electrically operated, and means for controlling said cut-off mechanism.

9. The combination with an engine having a main valve opened and closed synchronously with its stroke, of an electrically-actuated variable cut-off mechanism and a governor therefor on said engine.

10. An engine provided with mechanically-operated inlet and exhaust valves, in combination with an automatic electrically-operated cut-off mechanism having a cut-off valve adapted to be closed electrically.

11. The combination with an engine the main valve of which opens and closes synchronously with its stroke, of a cut-off mechanism comprising a valve, electromagnets, a governor connected to some moving portion of the engine, a commutator moving synchronously with the stroke of the engine, contacts having variable movements, and an electric supply, said magnets adapted to be energized and deënergized alternately, the mechanism being so arranged that either magnet when energized will cause the pressure-supply to be instantly cut off from the cylinder of the engine.

12. The combination with an engine having mechanically-operated inlet-valves, of a cut-off mechanism provided with a commutator having a fixed movement in relation to the stroke of the engine, contacts adapted when in operative position to contact alternately with said commutator, and means for shifting the contacts from inoperative to operative and from operative to inoperative positions as the speed of the engine varies.

13. In a cut-off mechanism for engines having mechanically-operated inlet-valves, cut-off valves, an electric supply, electromagnets, a commutator having a fixed movement in relation to the stroke of the engine connected to one pole of the electric supply, movable contacts connected through similar poles in the electromagnets to the other pole of the electric supply, and means for automatically making and breaking the circuits as the speed of the engine varies.

14. An engine having mechanically-operated inlet-valves, in combination with a cut-off mechanism having cut-off valves, an electric supply, electromagnets, a commutator connected to one pole of the electric supply, and contacts connected through similar poles in the electromagnets to the other pole of the electric supply.

15. An engine having mechanically-operated inlet-valves, in combination with a cut-off mechanism electrically operated, having a commutator, and two contacts adapted when in operative position to contact alternately with said commutator.

16. In an engine, a mechanically-operated main valve, a cut-off valve, electrically-operated means for opening and closing the cut-off valve, and means dependent upon the speed of the engine for varying the time of closing of said cut-off valve.

17. In engines, inlet-valves, an exhaust-port, eccentrically-actuated means for opening and closing said port, a cut-off member, stationary electromagnets, an armature connected to said cut-off member and adapted to oscillate between said electromagnets, and means for exciting said electromagnets.

18. In engines, an exhaust-port, means for opening and closing said port operated by an eccentric, a cut-off member, an armature connected with said cut-off member, stationary electromagnets, an oscillating commutator connected to one pole of an electric supply, a governor, and two movable contact members connected to a similar pole in said electric supply.

19. The combination in an engine of inlet-valves, mechanical means for operating said valves, electromagnets, a governor, a moving commutator having a fixed movement in relation to the stroke of the engine, and two contact elements adjacent to said commutator the contact-surfaces of which are adapted to have variable movements, said variations depending upon the speed of the engine.

20. The combination with an engine having mechanically-operated inlet and exhaust valves of an electrically-actuated cut-off mechanism.

21. In an engine, a mechanically-operated main valve, a cut-off valve, electrically-operated means for closing the cut-off valve, and means for varying the time of closing said cut-off valve when the speed of the engine is above normal.

22. In an engine, mechanically-operated inlet-valves, cut-off valves, and electrically-operated means for opening and closing said cut-off valves.

23. In an engine, a mechanically-operated inlet-valve, a cut-off valve electrically operated, and a governor by means of which the closing time of said cut-off valve will be varied according to the speed of the engine.

24. In engines, an exhaust-port adapted to be opened and closed by mechanical means, steam-valves, an armature, a governor, a commutator having a fixed movement in relation to the stroke of the engine, and two movable contact elements having variable movements the length of which depend upon the speed of the engine.

25. In engines, an exhaust-port, mechanical means for opening and closing said port, inlet-valves, cut-off valves, a commutator having a fixed movement in relation to the stroke of the engine, two movable contact members adapted when in operative position to contact alternately with said commutator, and means for shifting the movable contact members from inoperative to operative and from operative to inoperative positions as the speed of the engine varies.

26. In engines, an exhaust-port adapted to be opened and closed by mechanical means, steam-valves, auxiliary inlet-valves, electromagnets, an electric supply, a commutator having a fixed movement in relation to the stroke of the engine connected to one pole of the electric supply, movable contact elements connected through similar poles in the electromagnets to the other pole of the electric supply, and means for automatically making and breaking the circuits as the speed of the engine varies.

27. In engines, an exhaust-port adapted to be opened and closed by means of an eccentric, steam-valves, electromagnets, an electric supply, an oscillating commutator having a fixed movement connected to one pole of the electric supply, and movable contact elements connected through similar poles in the electromagnets to the other pole of the electric supply.

28. In engines, an exhaust-port, mechanical means for opening and closing said port, steam-valves, a commutator having a fixed movement in relation to the stroke of the engine and two movable contact elements adapted when in operative position to contact alternately with said commutator.

29. The combination in a steam-engine, of steam-valves, a main shaft, connections between said main shaft and said steam-valves, a cut-off member, an armature, connections between said cut-off member and said armature, a governor, electromagnets and means operated by said governor for exciting said electromagnets and cutting off the steam-supply.

30. In an engine, a main valve, an exhaust-port, mechanical means for opening and closing said valve and said port, a cut-off valve, an armature, a governor, electromagnets, and means controlled by the governor for exciting said magnets and closing said cut-off valve.

31. The combination in a steam-engine of steam-valves, a main shaft, connections between said main shaft and said steam-valves, a sliding cut-off member, a swinging armature, adjustable connections between said cut-off member and said armature, a governor, stationary electromagnets on either side of said armature and means operated by the governor for exciting said electromagnets.

32. The combination in a steam-engine of steam-valves, a main shaft, connections between said main shaft and said steam-valves, a cut-off member in connection with an armature, electromagnets, a source of electric supply and means for automatically exciting the electromagnets and cutting off the steam-supply as the speed of the engine varies.

33. The combination in a steam-engine of steam-valves, a main shaft, connections between said steam-valves and said main shaft, a sliding cut-off member in connection with a swinging armature, stationary electromagnets, a source of electric supply and means for automatically exciting the magnets and cutting off the steam-supply as the speed of the engine varies.

34. The combination in a steam-engine of steam-valves, a main shaft, connections always between said main shaft and said steam-valves, a cut-off member, a pivoted armature in connection with said cut-off member, a governor having a sliding member, an oscillating commutator, and two pivoted contact elements adapted to move toward or away from a certain point on said commutator as the speed of the engine varies.

35. In engines, a main valve, an exhaust-port, a main shaft, mechanical means connected to said main shaft for opening and closing said valve and said port, a cut-off member, a pivoted armature in connection with said cut-off member, a governor, an oscillating commutator, and two movable contact elements adapted to approach or recede from portions of said commutator as the speed of the engine varies.

36. The combination in a steam-engine of steam-valves, a main shaft, connections between said steam-valves and said main shaft, a sliding cut-off member, a swinging armature, adjustable connections between said cut-off member and said armature, a governor, an oscillating commutator, connections between said commutator and the main shaft, and two pivoted contact elements adapted to move toward or away from a certain point on said commutator as the speed of the engine varies.

37. The combination in a steam-engine of the steam-valves, a main shaft, connections between said steam-valves and said main shaft, a cut-off member, electromagnets, an oscillating armature, connections between said armature and the cut-off member, and means for exciting said electromagnets and cutting off the steam-supply while said magnets remain excited.

38. In steam-engines a main valve, an exhaust-port, a main shaft, means connected with said main shaft for opening and closing said valve and said port, a cut-off member, electromagnets, an oscillating armature and means for exciting said electromagnets and cutting off the steam-supply while said magnets remain excited.

39. The combination in a steam-engine of steam-valves, a main shaft, means connected to said main shaft for operating said valves, a sliding cut-off member, stationary electromagnets, an armature pivoted between said magnets and adapted to be attracted alternately by said magnets, connections between said armature and the cut-off member and means for exciting said electromagnets.

40. In an engine, the combination of the main valve mechanically operated with a cut-off valve electrically operated and means for varying the time of closing of the cut-off valve.

41. In engines, mechanically-operated inlet and exhaust valves, electromagnets, and a cut-off member connected to an armature adapted to swing between said electromagnets and to cut off the pressure-supply through the attractive force of said magnets.

42. The combination in a steam-engine of steam-valves, a main shaft, connections between said steam-valves and said main shaft, a sliding cut-off member, an armature adjustably connected to said cut-off member, stationary electromagnets one on each side of said armature, an oscillating commutator connected to one pole of an electric supply and operated by an eccentric on the main shaft, a governor, two oscillating contact members connected to a similar pole in said electric supply and adapted to be moved by the governor as the speed of the engine varies.

43. The combination in a steam-engine of steam-valves, a main shaft, connections between said main shaft and the steam-valves, a cut-off member in adjustable connection with a pivoted armature, stationary electromagnets, a source of electric supply and means for automatically exciting or cutting out the electromagnets as the speed of the engine varies.

44. The combination with an engine having mechanically-operated inlet and exhaust valves, of an independent automatic electrically-actuated variable cut-off mechanism, and a governor on said engine for controlling said cut-off mechanism.

45. The combination in a steam-engine of steam-valves, a main shaft, an eccentric on the main shaft and connections between said eccentric and said valves, a sliding cut-off member, a pivoted armature, adjustable connections between said cut-off member and said armature, a governor, connections between said governor and said main shaft, an oscillating commutator, an eccentric on said main shaft for moving said commutator, and two pivoted contact elements adjacent to said commutator and adapted to approach or recede from a certain point on said commutator as the speed of the engine varies.

46. The combination in a steam-engine of steam-valves, a main shaft, means connected with said main shaft for operating said steam-valves, an armature, a governor, an oscillating commutator having a fixed movement in relation to the stroke of the engine and two movable contact members adjacent to said commutator and having variable movements the length of which depend upon the speed of the engine.

47. The combination in a steam-engine of steam-valves, a main shaft, means in connection with said main shaft for positively operating said steam-valves, a commutator having a fixed movement in relation to the stroke of the engine, two movable contact members adapted when in operative position to contact alternately with said commutator and means for automatically shifting the movable contact members from inoperative to operative and from operative to inoperative positions as the speed of the engine varies.

48. In engines, inlet and exhaust valves operated mechanically, electromagnets, an electric supply, an oscillating commutator having a fixed movement in relation to the stroke of the engine and connected to one pole of the electric supply, movable contact elements connected through similar poles in the electromagnets to the other pole of the electric supply; and means for automatically making and breaking the circuit as the speed of the engine varies.

Signed by me at Milwaukee, Wisconsin, this 16th day of November, 1899.

LOUIS JOHNSON.

Witnesses:
　　JNO. S. GREEN,
　　J. W. FLYNN.